Figure 12:
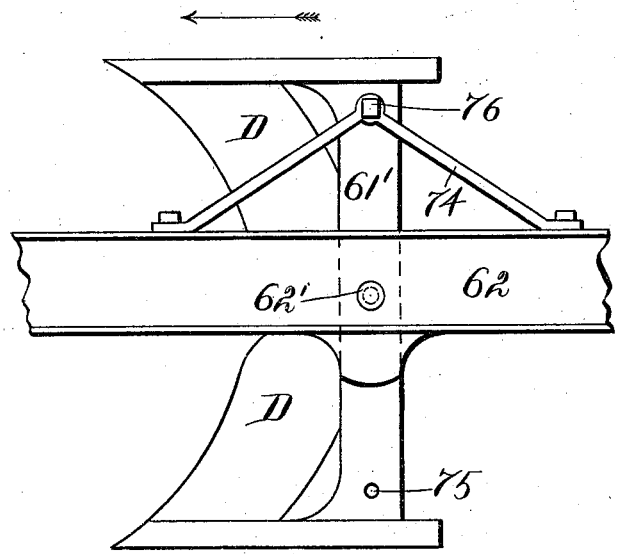

(No Model.)  6 Sheets—Sheet 1.
C. F. HINMAN.
GRADING AND DITCHING MACHINE.
No. 557,125. Patented Mar. 31, 1896.
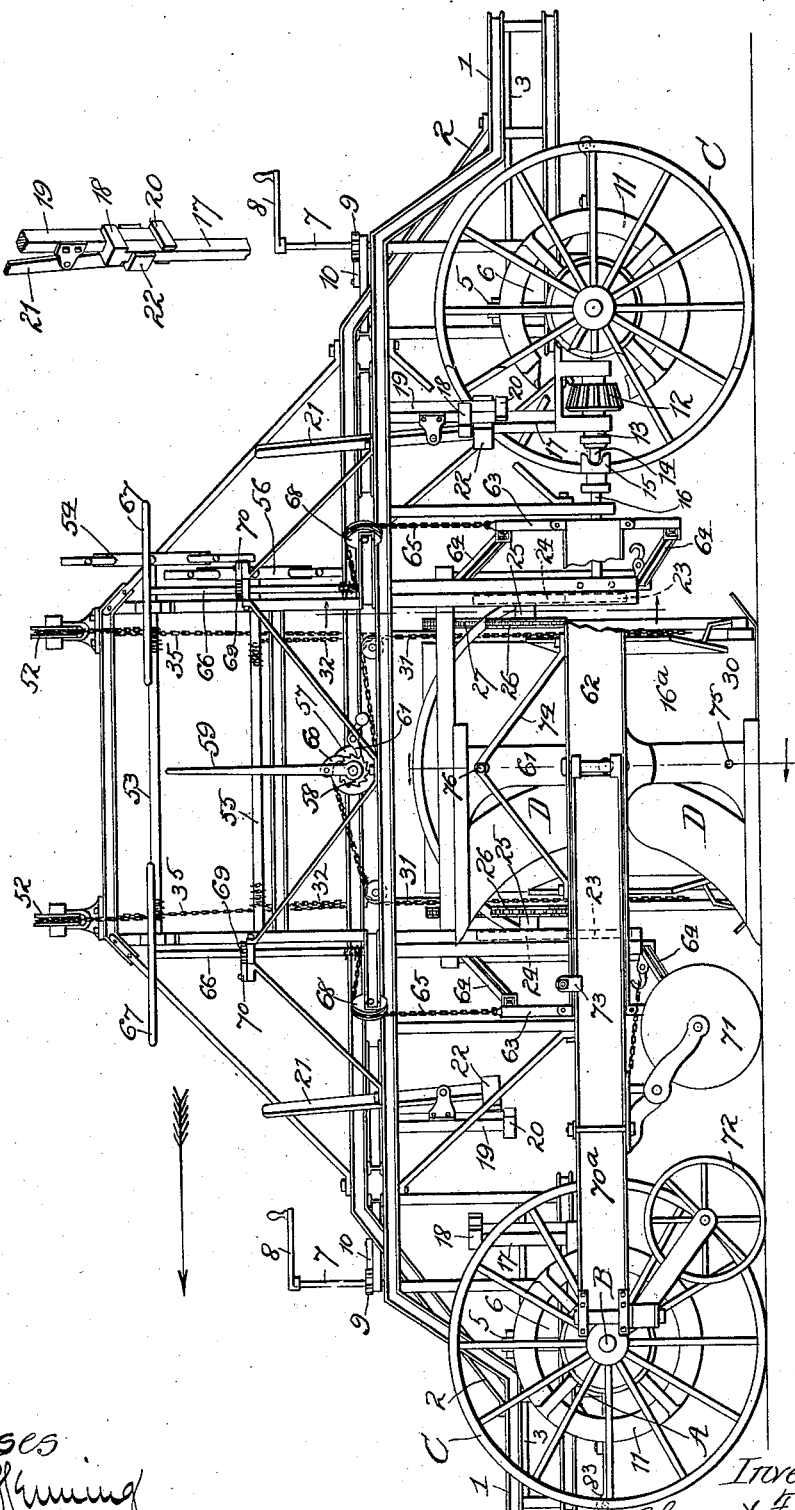
Witnesses
Inventor
Clement F. Hinman
by Chas. G. Page Atty.

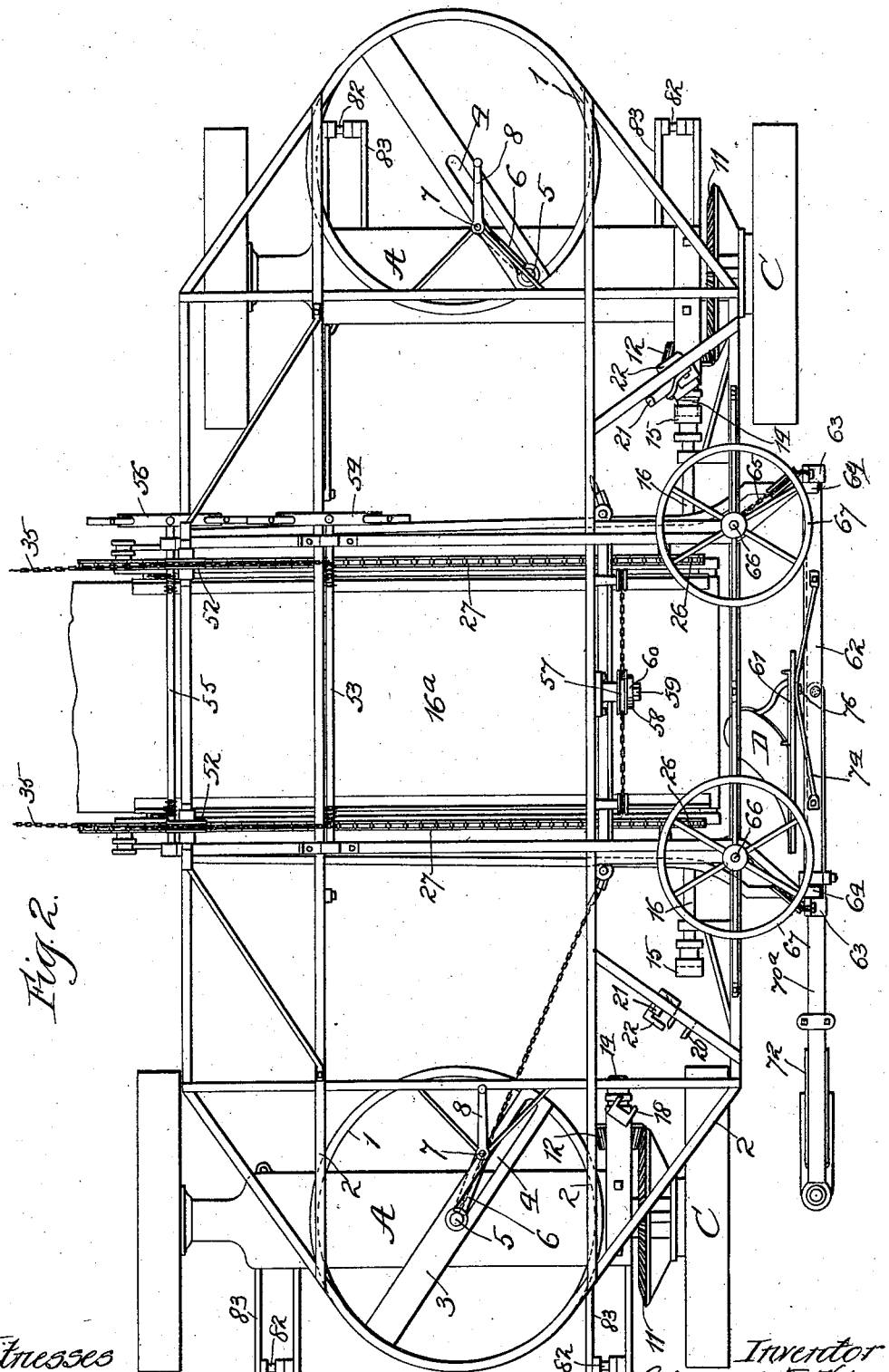

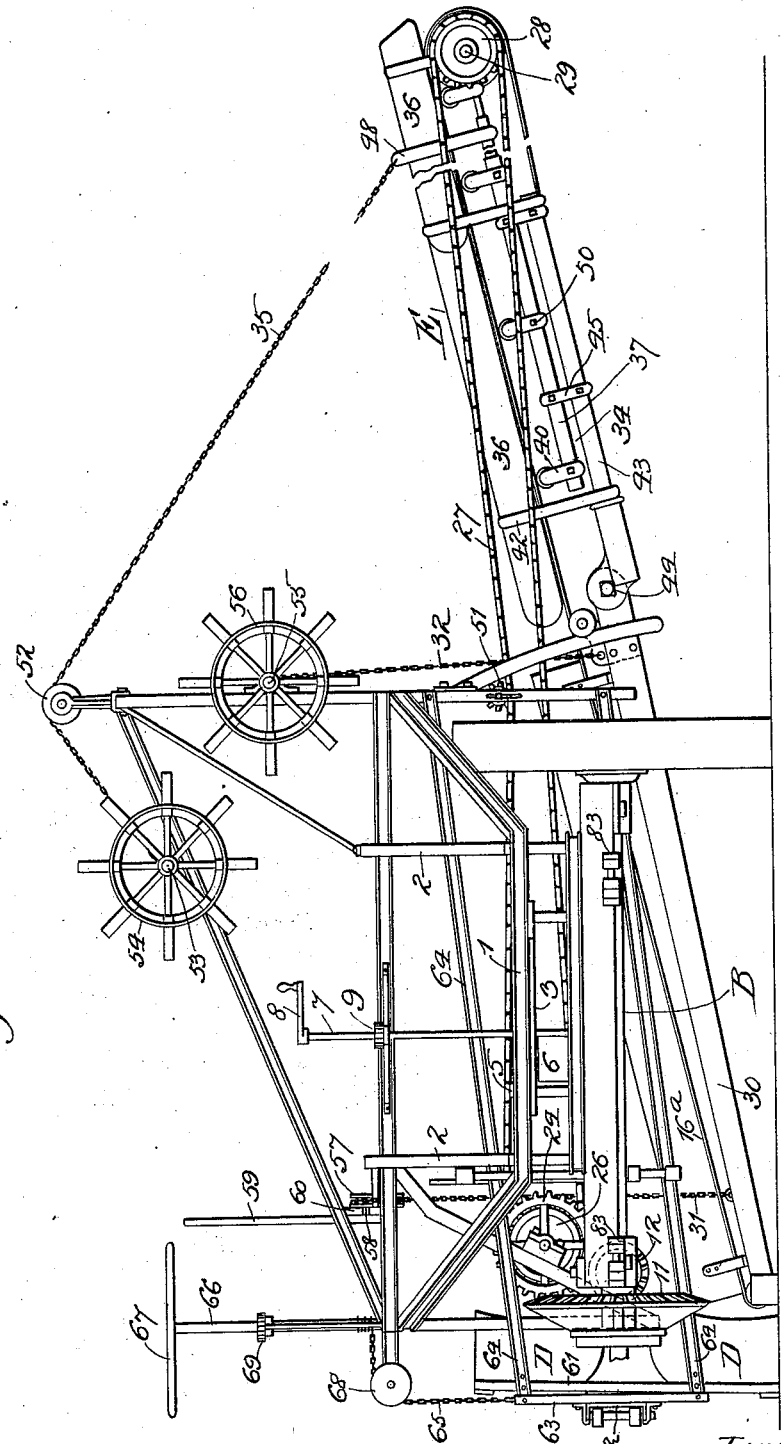

(No Model.) 6 Sheets—Sheet 4.
C. F. HINMAN.
GRADING AND DITCHING MACHINE.
No. 557,125. Patented Mar. 31, 1896.
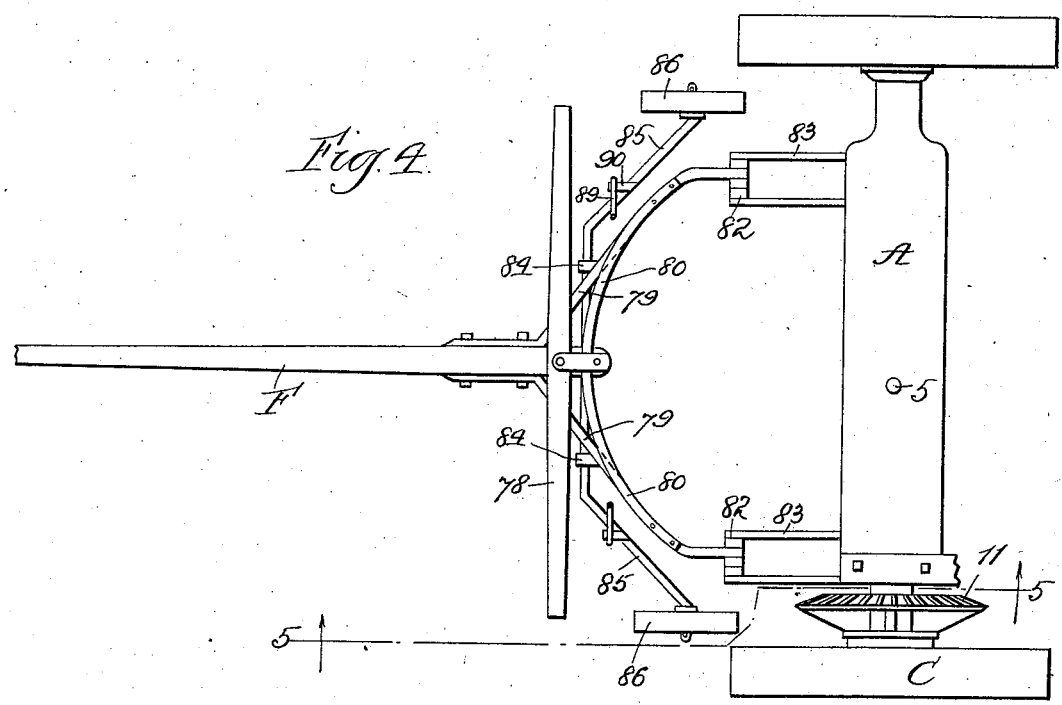
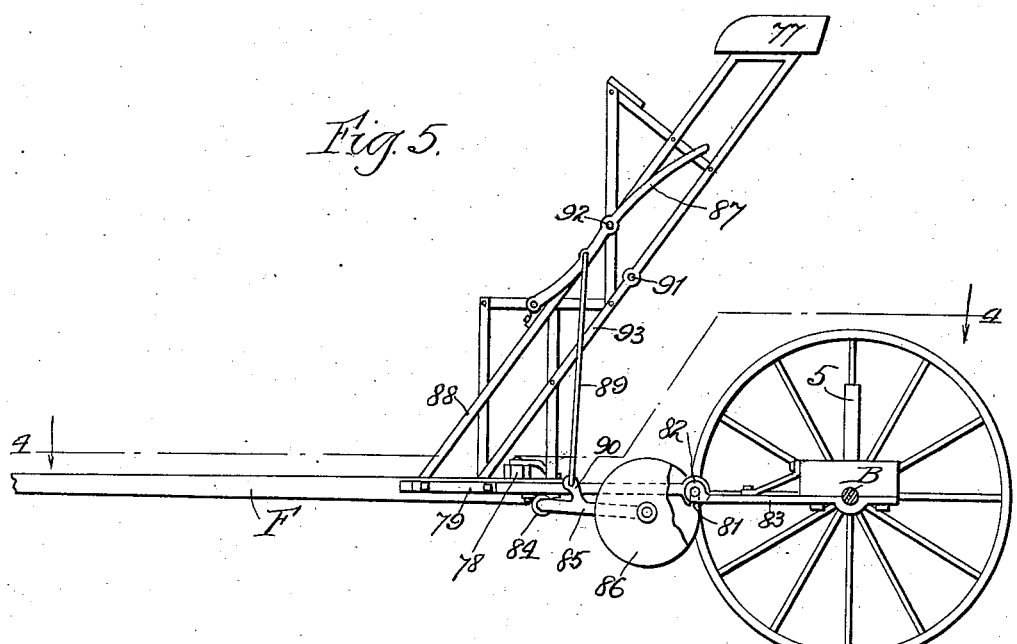

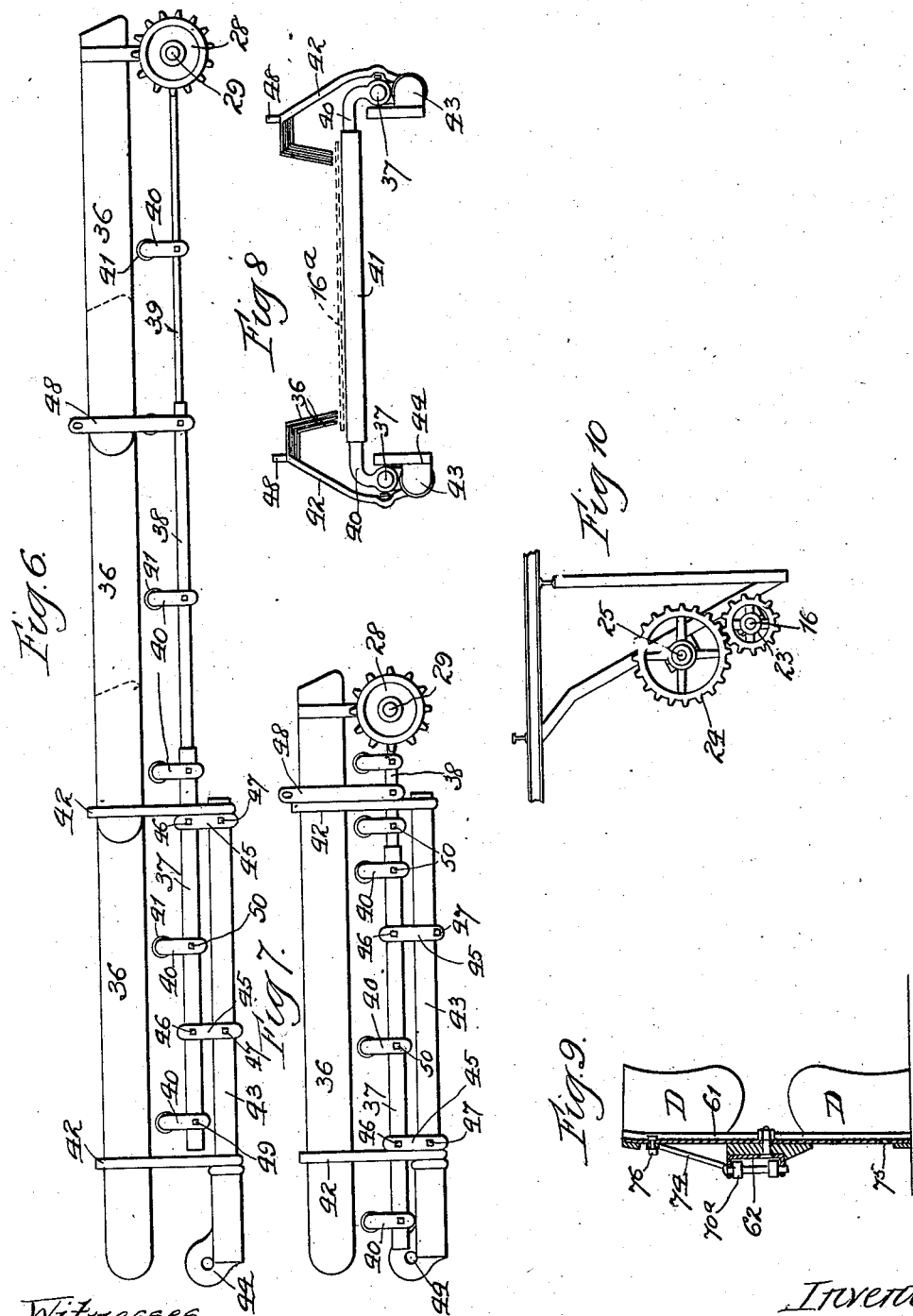

(No Model.) 6 Sheets—Sheet 6.
C. F. HINMAN.
GRADING AND DITCHING MACHINE.

No. 557,125. Patented Mar. 31, 1896.

Witnesses:
A. F. Durand.
Rota M. Wagner.

Inventor.
Clement F. Hinman.
By Chas. G. Page, Atty.

UNITED STATES PATENT OFFICE.

CLEMENT F. HINMAN, OF CHICAGO, ILLINOIS, ASSIGNOR TO FREDERICK C. AUSTIN, OF SAME PLACE.

GRADING AND DITCHING MACHINE.

SPECIFICATION forming part of Letters Patent No. 557,125, dated March 31, 1896.

Application filed July 9, 1894. Serial No. 516,978. (No model.)

*To all whom it may concern:*

Be it known that I, CLEMENT F. HINMAN, a citizen of the United States, residing at Chicago, in the county of Cook and State of Illinois, have invented a certain new and useful Improvement in Grading and Ditching Machines, of which the following is a specification.

My invention relates to grading and ditching machines of the kind in which the soil is turned up by a plow and delivered therefrom to an elevating-carrier, from which latter the soil is delivered either alongside the road or into a companion wagon or receiving-machine.

The object of my invention is to provide a reversible grader which can be drawn back and forth and operated without turning the machine, thereby economizing both time and labor and permitting the machine to be easily worked under all conditions and to take a furrow slice from one side of the road at each movement of the machine.

To accomplish such ends I provide a plow having two shares, the moldboards of which extend in the same direction.

As a matter of further improvement I pivot or otherwise movably attach the plow-standard centrally of its length to a movable portion of the machine, preferably in this instance upon a movable plow-beam, and provide means whereby the said plow may be rigidly locked in its operative position in order to prevent any swinging or rocking movement when the machine is in operation. In conjunction with the plow-beam I provide a hinged or pivoted beam or extension, to which are suitably connected a colter and a gagewheel, the latter being arranged for convenient up and down adjustment, said beam or extension being adapted to be swung in the arc of a circle, whereby to bring the colter in front of the plow when the latter is plowing a furrow, and in order to permit of the easy and ready reversal of the plow I provide a simple form of lifting mechanism connecting by preference with the plow-beam, which mechanism when operated lifts the plow clear of the furrow and permits of its being swung upon its pivot.

As a matter of further and specific improvement I provide a carrier having two sets of propelling mechanism, each operating independently of the other, one set being engaged by the driving mechanism of one of the drive-wheels when the machine is moving in one direction and the other set in a like manner by the driving mechanism of the other drive-wheel when the machine is moving in the opposite direction. In order to accomplish the automatic engagement of the carrier-propelling mechanism with the driving mechanism of the drive-wheels and also its releasement upon the reverse movement of the machine, I provide an axle-shifting mechanism, which operates automatically, when the machine is moving in one direction, to shift the rear drive-wheel laterally into alinement with the plow and into engagement with the carrier-propelling mechanism at the rear of the machine and the front drive-wheel to one side of the plow and out of engagement with the carrier-propelling mechanism, and when moved in the opposite direction to reverse the position of the respective wheels. Various devices may be employed for accomplishing these results; but as simple and effective means I employ two plates, one located at each end of the machine and arranged at opposite angles to an imaginary line drawn lengthwise through the machine. Within each of these plates is formed a slot, in which work the king-bolts of the two axles, suitable means being employed for securely locking the said axles in their shifted positions.

When the machine is to be moved forward in one direction, the king-bolt of the rear axle is caused to move to the outer end of the slot and abuts against the wall thereof, said wall, in conjunction with a suitable clamping device, serving to hold the said axle against swinging while the plow is cutting a furrow, while the king-bolt of the front axle is caused to move to the inner end of the slot, which end, being located centrally of the width of the machine, leaves the front axle free to turn on the bolt, in order, if desired, to permit of the machine being turned around.

I also provide other novel arrangements of parts, as will be hereinafter fully described and claimed.

Figure 13:
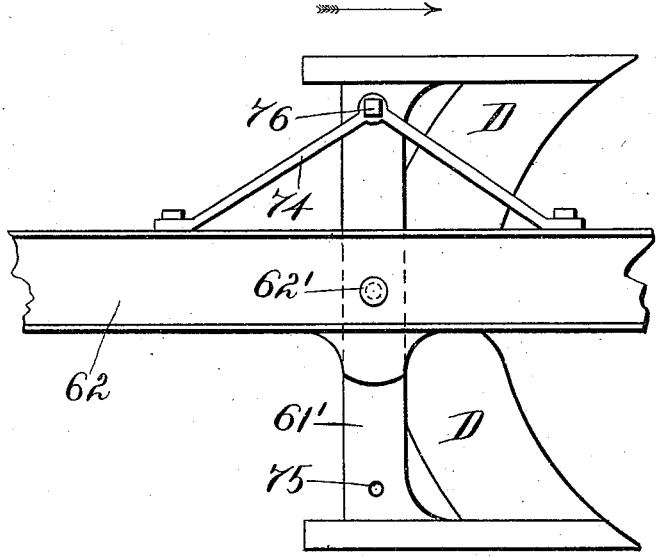

In the accompanying drawings, forming a part of this specification, and in which like numerals and letters of reference indicate corresponding parts, Figure 1 is a side elevation of a grading and ditching machine constructed in accordance with my invention. Fig. 2 is a top plan view of the same. Fig. 3 is an end elevation, looking in the direction of the arrow in Fig. 1. Fig. 4 is a plan view of the tongue and its attached supporting-wheels. Fig. 5 is a side elevation of Fig. 4. Fig. 6 is a detached detail view of the extension-carrier extended. Fig. 7 is a similar view of the carrier closed. Fig. 8 is an end view of the carrier. Fig. 9 is a transverse section through the plow. Fig. 10 is a detail view of the gears for operating the carrier. Fig. 11 is a perspective detail view of the clutch for locking the driving mechanism of the drive-wheel into engagement with the mechanism for operating the carrier. Fig. 12 is a side elevation of the plow and part of the plow-beam. Fig. 13 is a like view showing the plow reversed.

The frame of the machine is constructed, preferably, of steel and is provided at each end with a bolster A, to each of which is suitably attached an axle B. As the mechanism of one half of the machine is a duplication of the other half both in construction and operation, a description of one portion will serve for both, the peculiar manner of their coaction being reserved for a final explanation, when the operation of the machine as a whole will be fully set forth.

Projecting outward from the frame is a circle-iron 1, which is suitably braced and held in rigid position by means of brace-rods 2. Extending diagonally across the circle-iron and firmly attached thereto by any preferred means is a bar or plate 3, which, from the function that it performs, I designate an "axle-shifter plate," or, as a matter of brevity, a "shifter-plate," by which term it will be hereinafter called.

The shifter-plate, which may be constructed of one or more pieces of metal, is provided with a slot 4, which extends from a point near where the plate is attached to the circle-iron to its center, and in this slot works the king-bolt 5 of the axle. When the axle is in the position to bring the drive-wheel C into alinement with the plow D, as shown at the right-hand end of Fig. 2, the king-bolt is at the outer end of the slot and is held in such position by any suitable locking mechanism—as, for instance, in the present instance by a block 6 carried by a rod 7, the latter being turned by a crank 8 located at its upper end. The rod is further provided with a ratchet-wheel 9 adapted to be engaged by a pawl 10, whereby to prevent the rod from turning when the block 6 is turned into engagement with the king-bolt when shifted to either end of the slot, the two positions occupied by the block being shown, respectively, at the right and left hand sides of Fig. 2.

The axle B carries a bevel-gear 11 in mesh with a similar gear 12 carried by one end of a shaft 13, the other end of which carries a lug or projection 14 adapted to engage a clutch 15 carried by a shaft 16 for actuating, through suitable mechanism, the apron or conveyer-belt 16ª of the carrier E. The bolster supports an upright 17 having its upper end provided with a clutch 18, and the frame carries a downward-extending rigid beam or hanger 19 having a clutch 20 constructed in the same manner as the clutch 18. The two clutches are arranged at an angle with relation to each other corresponding to the angle of the slot 4, so that when the axle is shifted to the position shown at the right of Fig. 2 to bring the lug 14 and the clutch 15 into engagement the clutch 18 will straddle the hanger 19 and the clutch 20 the upright 17 and thus form a rigid union for firmly holding the two shafts 13 and 16 in the proper locked relation with each other.

In order to prevent the clutches from becoming unlocked during the operation of plowing, as from strain or jars incident to the contact of the plow-point with obstructions, a locking device is employed preventing such a contingency. Among the many devices that may be employed for this purpose I employ, from a standpoint of simplicity and effectiveness, a lever 21, which is suitably pivoted to the hanger 19 and is provided with a clutch 22, which is adapted to straddle the hanger and the upright at a point between the clutches 18 and 20, as clearly shown in Fig. 11, and thus firmly hold such parts from becoming disengaged until the lever is moved to the position requisite to permit of their separation, such position being shown at the left hand of Fig. 1.

The free end of the shaft 16 carries a gear 23 in mesh with a gear 24, the stud or shaft 25 of the latter carrying a sprocket-wheel 26, around which passes a sprocket-chain 27 and from thence to and around a sprocket-wheel 28 carried by a shaft 29 located on the outer end of the carrier-frame E and imparts motion to the conveyer-belt 16ª in an obvious manner, and as the latter may be one of the various forms in common use a further description of it is deemed unnecessary. The carrier is composed of two parts, an inner portion 30, which is movably supported by means of chains 31 and 32, and an outer extensible portion 34 hinged or otherwise connected to the portion 30 and having its outer end supported from the main frame by means of chains 35.

The inner portion of the carrier-frame is constructed, preferably, of a single section and the outer portion 34 of a series of telescoping or longitudinally-sliding sections 36. In carriers of this character it is not only requisite that the sections should be so arranged as to permit of their being readily extended and closed, but also that, when extended, provision should be made whereby to permit of the sections being firmly held in their extended position. Various means have been adopted for this purpose, all of which possess more or less merit; but I have found that the construction herein illustrated is best adapted and most readily answers all the requirements arising from changing the length of the carrier to cause it to carry a greater or a less distance. In constructing a carrier-frame in accordance with my improvements I employ a series of sections of tubing 37, 38 and 39, adapted to telescope one within the other, said tubing having secured thereto at desired intervals brackets or supports 40, on which work the rollers 41, over which the conveyer-belt 16ª travels.

Depending from the outer section of the carrier 36 are a series of hangers 42, to which are suitably secured the main supporting-bars 43, having their rear ends provided with eyes 44 to permit of their being hinged or pivoted to the inner section 30, as before stated.

The supporting-bars are connected with the rear section 37 of the tubing by means of plates or the like 45, which are provided with openings, (not shown,) through which the rods 43 and tubing extend, bolts 46 and 47 being employed for the purpose of securing the parts in their adjusted positions. In addition to the hangers 42 are two hangers 48, one on each side of the carrier-frame, to which the elevating-chains 35 are attached.

When the carrier is closed, as shown in Fig. 7, and it is desired to extend it, the bolts 47, 49 and 50, carried, respectively, by the plates 45, one of the supports 40, and hangers 48 are loosened, thus allowing the tubings and the sections 36 to be drawn out, as shown in Fig. 6, in which position the carrier is caused to assume its greatest length. When it is desired to shorten the length of the carrier in order to reduce its carrying distance, the reverse of the steps just described is observed with the additional step of removing the requisite number of links from the chain 27 to take up the slack caused by such shortening of the carrier-frame, an adjustable idler 51 serving to keep the chain under the proper tension at all times.

The chains 35 pass over a pulley 52 and are attached to a common shaft 53 carrying a hand-wheel 54 for imparting motion thereto, suitable pawl-and-ratchet mechanism (not shown) serving to prevent any reverse rotation of the shaft when the carrier-frame has been moved to the proper height. The chains 32 are also attached to a common shaft 55, which is operated by means of a hand-wheel 56 and is held against reverse movement in the same manner as the shaft 53. The free ends of the chains 31 connecting with the inner portion of the carrier-frame are attached on opposite sides of a drum 57, to which is attached a ratchet-disk 58. On the shaft of the drum is loosely mounted a lever 59 carrying a pawl 60, which, when the lever is vibrated, engages the ratchet-disk and rotates the drum, and thereby elevates or depresses the inner end of the carrier, a weighted pawl 61 serving to prevent backward rotation of the drum.

As shown in Fig. 3, the carrier-frame is arranged in a straight line; but it is to be understood that its outer portion 34 may be lowered or raised independently of the inner portion by operating the hand-wheels 54 and 56 in a manner that will be perfectly obvious.

The plow D has its standard 61' pivoted to a channel-beam 62 by a bolt 62', Fig. 9, said beam being firmly bolted at each end to cross-pieces 63. To the top and bottom of each of the cross-pieces are secured supporting-beams 64, which extend back and are bolted to the frame of the machine, the connection of the beams with the cross-pieces and the frame being such as to permit of a rocking or pivotal movement of the beams at these points of attachment when the plow is raised or lowered. The latter movement is effected through the medium of two chains 65, which are attached at their lower ends to the cross-pieces 63 and at their upper ends to brake-rods 66 carrying hand-wheels 67, two sheaves 68 being employed to serve as guides for the chains. The brake-rods carry each a ratchet-wheel 69, a pawl 70 serving, when in engagement therewith, to prevent any reverse turning of the rod when the plow has been elevated to the desired point. As before stated, the moldboards of the double plow D both extend in the same direction—i. e., toward the conveyer-apron 16ª—so that it will be obvious that the upturned soil will be fed thereto irrespective of the direction in which the machine may be moving.

Pivoted to the beam 62 by a bolt 71ª is an arm or extension 70ª carrying a colter 71 and a gage-wheel 72, the latter being arranged for convenient up and down adjustment, and as this feature is common and well understood a further description is deemed non-essential. When the arm 70ª, which is preferably I-shaped in cross-section, is swung so as to bring the gage-wheel into alinement with the plow, it fits between the flanges of the beam 62, as clearly shown in Fig. 2, and is therefore braced throughout its entire length against upward strain and is held firmly in place, whereby to cause the gage-wheel properly to perform its function. In order to prevent the arm from swinging outward from the plow-beams when the plow is in operation, a suitable locking device is employed for clamping these parts together, such device in this instance comprising a cleat or turn-button 73, which is suitably attached to the beam and when turned down overlaps the flange of the arm.

In order to prevent the plow from turning when in operation, the plow-beam is provided in this instance with an inverted-V-shaped brace-rod 74 provided at its apex with an opening adapted to register alternately with one of a pair of openings 75 in the plow-beam, a bolt 76 passing through the two alined openings serving to clamp the beam and brace-rod firmly together.

In Figs. 4 and 5 is illustrated my improved tongue to be used in connection with the machine herein described, although it is to be understood that the same is applicable to other forms of grading and ditching machines and also to vehicles requiring a very heavy tongue—such, for example, as a farm-wagon or the like.

The draft-tongue F is provided with the usual seat 77 and with a doubletree 78, to which are swung the singletrees, (not shown,) and as their operation is well understood further description is unnecessary. Secured to the rear end of the tongue by suitable brace-rods 79 is a curved shackle-iron 80, having its free ends enlarged and provided with slots or recesses 81 for engaging the bearings 82 of the shackles or supports 83 carried by the axle. The shackle-iron has attached to it two eyes 84, in which is loosely mounted and held a bent axle 85 carrying at each end a wheel 86. The wheels 86 are normally held out of engagement with the ground by means of a lever 87 pivoted at its lower end to one of the seat-beams 88, a rod 89 connecting with the lever and with a projection 90 on the axle 85 constituting an operative connection between the two parts. Each of the seat-beams is provided with an opening 91, the two openings being alternately engaged, according as the axle is raised or lowered, by a pintle or projection 92 carried by the lever 87. When the axle 85 is raised, as shown in Fig. 5, the pintle is in engagement with the opening in the beam 88, and when lowered with the opening in the beam 93. The object of the wheels 86 is to uncouple the tongue from the machine and support the same when the direction of movement of the machine is to be reversed, which reversal will not necessitate the driver's leaving his seat. To accomplish the uncoupling of the tongue, the lever is pressed down until the wheels contact with the ground and lift the slotted ends of the shackle-iron out of engagement with the bearings 82 of the shackles 83. The pintle 92 is then brought into engagement with the opening 91 in the beam 93 and the wheels 86 are locked in their lowered position.

It is to be understood that various other means may be employed for lifting and supporting the draft-tongue; but from a standpoint of simplicity and durability that illustrated will be found to meet the requirements of most cases.

In describing the operation of the machine we will suppose that it has been moving in the direction indicated by the arrow in Fig. 1 and has reached the limit of its cut and is to start on its return trip. The first step necessary will be to raise the plow clear of the ground, which is accomplished by turning the hand-wheels 67 in the manner already described. The lever 21 is then thrown back, thus leaving the clutches 18 and 20 free to separate, and the cranks 8 are turned to move the blocks 6 out of engagement with the king-bolts.

The front axle, or the one at the left in Figs. 1 and 2, can now be shifted by backing the team sufficiently to force the king-bolt 5 to the outer end of slot 4, thereby bringing the drive-wheel into alinement with the plow and the shafts 13 and 16 and the clutches 18 and 22 into locking engagement with each other. The team is then uncoupled and driven to the other end of the machine, where the tongue is then coupled with the rear axle, or the one at the right in Figs. 1 and 2, and the same shifted by a forward pull of the team, thus forcing the king-bolt of said axle to the center of plate 3 and also releasing the clutch mechanism and the shafts 13 and 16 from engagement with each other. The bolt 76 in the plow-standard is then removed and the plow reversed and again secured by the bolt, after which the beam 70$^a$ is swung around to bring the colter in front of the plow, the cranks 8 are rotated to turn the blocks into locking engagement with the king-bolts, the lever 21 is moved to cause the clutch 22 to lock the clutches 18 and 20, and the machine is ready for its return trip.

While I have described my machine as being driven by horse-power, it is to be understood that, if desired, I may drive the same by steam-power in a manner that will be perfectly obvious.

It is also to be understood that when the plow is raised or lowered so as to diminish or increase its cut the inner section of the carrier is likewise raised or lowered in order to be caused to occupy its proper relation with regard to the plow.

What I claim as my invention is—

1. In a grading and ditching machine a pivotally-held reversible plow having a couple of plowing portions pointing in the same direction and means for temporarily locking the reversible plow against turning, so as to maintain one of its plowing portions uppermost and the other in position for work said reversible plow being arranged to turn about its pivotal connection with the machine when unlocked, and thereby permit the latter to be drawn back and forth and operated without being turned around.

2. In a grading and ditching machine, a reversible plow pivotally connected with a plow-beam and having a couple of plowing portions pointing in the same direction, means for temporarily locking the reversible plow against turning so as to maintain one of its said plowing portions uppermost, and the other in position for work, said reversible plow being arranged to turn about its pivotal connection with the machine when unlocked.

3. In a grading and ditching machine, a reversible plow pivotally connected with a plow-beam, and having a couple of plowing portions pointing in the same direction, means for temporarily locking the reversible plow against turning so as to maintain one of its said plowing portions uppermost and the other in position for work, said reversible plow being arranged to turn about its pivotal connection with the machine when unlocked, and mechanism for raising and lowering said beam.

4. A grading and ditching machine having a reversible plow, and a reversible gage-wheel.

5. A grading and ditching machine having a reversible plow and a reversible colter and gage-wheel.

6. A grading and ditching machine having a reversible plow, a reversible colter and gage-wheel, and means for locking the parts in their operative position.

7. A grading and ditching machine having an adjustable beam a reversible plow carried thereby and an arm pivoted to the beam and carrying a colter and gage-wheel.

8. A grading and ditching machine having a beam movably supported from the machine-frame, a reversible plow carried thereby and a movable arm carrying a colter and gage-wheel.

9. A grading and ditching machine having a plow-beam movably supported by means of beams pivotally connected with the machine-frame, a pivoted reversible plow carried by the beam, and means for raising or lowering the said beam.

10. A grading and ditching machine having a beam movably supported from the machine-frame and carrying a reversible plow, a movable arm supported by the beam and carrying a colter and gage-wheel, and means for raising and lowering the said beam.

11. A grading and ditching machine having a beam movably supported from the machine-frame and carrying a reversible plow, a movable arm supported by the beam and carrying a colter and a gage-wheel, means for raising and lowering the said beam, and locking mechanism for holding the plow and the said arm in their operative positions.

12. In a grading and ditching machine the combination of a plow-beam movably supported by means of beams pivotally connected with the machine-frame, a reversible plow pivoted on said plow-beam, mechanism for locking the plow in a working position and an elevating-carrier, substantially as described.

13. In a grading and ditching machine, the combination of a plow-beam movably supported by means of beams pivotally connected with the machine-frame, a reversible plow pivoted on said plow-beam, mechanism for locking the plow in a working position and an adjustable elevating-carrier, substantially as described.

14. In a grading and ditching machine a pivotally-held reversible plow having a couple of plowing portions pointing in the same direction, means for temporarily locking the reversible plow against turning so as to maintain, one of its said plowing portions uppermost and the other in position for work, said reversible plow being arranged to turn about its pivotal connection with the machine, and an elevating-carrier, substantially as described.

15. In a grading and ditching machine, the combination of a reversible plow, a reversible colter and gage-wheel and an elevator-carrier.

16. In a grading and ditching machine, the combination of a reversible plow, a reversible colter and gage-wheel, an elevator-carrier, and mechanism for adjusting the respective parts with relation to each other.

17. A grading and ditching machine comprising a reversible plow and longitudinally-adjustable front and rear axles whereby the wheels can be set with relation to the plow.

18. A grading and ditching machine comprising a reversible plow and self-adjusting front and rear axles whereby the wheels can be set with relation to the plow.

19. A grading and ditching machine comprising a reversible plow, a pair of axles for the supporting or drive wheels, and mechanism for shifting the axles with relation to the plow in order to bring the rear drive-wheel on the plow side of the machine into alinement with the plow and the front drive-wheel to one side thereof.

20. A grading and ditching machine comprising a reversible plow, a pair of axles for the supporting or drive wheels, and mechanism for automatically shifting the axles with relation to the plow in order to bring the rear drive-wheel on the plow side of the machine into alinement with the plow and the front drive-wheel to one side thereof.

21. A grading and ditching machine comprising a reversible plow, longitudinally-adjustable front and rear axles to permit of the supporting-wheels being set with relation to the plow, and a reversible colter and gage-wheel.

22. A grading and ditching machine comprising a reversible plow and automatically-shifting axles for the supporting-wheels.

23. A grading and ditching machine comprising a reversible plow, automatically-shifting axles for the supporting-wheels, and a reversible colter.

24. A grading and ditching machine comprising a reversible plow, automatically-shifting axles for the supporting-wheels, a reversible colter, and an elevator-carrier.

25. A grading and ditching machine comprising a reversible plow, automatically-shifting axles for the supporting-wheels, and mechanism for locking the axles in their shifted positions.

26. A grading and ditching machine having an elevator-carrier and propelling mechanism therefor, and longitudinally-adjustable front and rear axles, carrying mechanism for operating the carrier-propelling mechanism.

27. A grading and ditching machine having an elevator-carrier and propelling mechanism therefor, and self-adjusting front and rear axles, carrying mechanism for operating the carrier-propelling mechanism.

28. A grading and ditching machine having an elevator-carrier and two sets of independently-operating propelling mechanisms and self-adjusting front and rear axles, carrying drive mechanism for alternately operating the carrier-propelling mechanism.

29. A grading and ditching machine comprising a reversible plow, an elevator-carrier carrying two sets of independently-operating propelling mechanisms, and self-adjusting front and rear axles carrying drive mechanism for alternately operating the carrier-propelling mechanism.

30. A grading and ditching machine comprising a reversible plow, a reversible colter, an elevator-carrier carrying two sets of independently-operating propelling mechanisms, and self-adjusting front and rear axles carrying drive mechanism for alternately operating the carrier-propelling mechanism.

31. A grading and ditching machine comprising a reversible plow, an elevator-carrier carrying two sets of independently-operating propelling mechanisms, self-adjusting front and rear axles carrying drive mechanism for alternately operating the carrier-propelling mechanism, and clutch devices for holding the drive mechanism and carrier-propelling mechanism in operative relation to each other.

32. A grading and ditching machine having a reversible plow, a traveling carrier provided with duplicate propelling mechanism, a pair of axles and drive-wheels thereon provided with mechanism for actuating the carrier-propelling mechanism and means for automatically shifting the axles whereby to change the relative positions of the drive-wheels as the direction of movement of the machine is reversed and at the same time disengage the driving mechanism of one of the drive-wheels from engagement with the carrier-propelling mechanism at one end of the machine, and bring the driving mechanism of the other drive-wheel into engagement with the carrier-propelling mechanism at the opposite end of the machine.

33. In a grading and ditching machine, a supporting-frame having at each end a plate provided with a slot, said plates being arranged at opposite angles to each other, and a pair of axles each having its king-bolt working in the slot of one of the plates.

34. In a grading and ditching machine, a supporting-frame having at each end a plate provided with a slot, said plates being arranged at opposite angles to each other, a pair of axles each having its king-bolt working in the slot of one of the plates, and means for locking the king-bolts within the slots.

35. A grading and ditching machine having a tongue, and mechanism for elevating and depressing the same whereby to detach it from or attach it to the machine.

36. A grading and ditching machine having a tongue provided with hooks or the like for engaging suitable projections on the machine, an axle on the tongue provided with supporting-wheels, and mechanism for moving the axle to bring the said wheels into engagement with the ground whereby to detach the tongue from the machine.

37. A grading and ditching machine having its tongue provided with a shackle-iron for engaging suitable shackles on the machine, a bent axle carried by the tongue and provided with supporting-wheels, and a lever for raising and lowering said axle, as and for the purpose specified.

CLEMENT F. HINMAN.

Witnesses:
RETA M. WAGNER,
R. M. ELLIOTT.